UNITED STATES PATENT OFFICE.

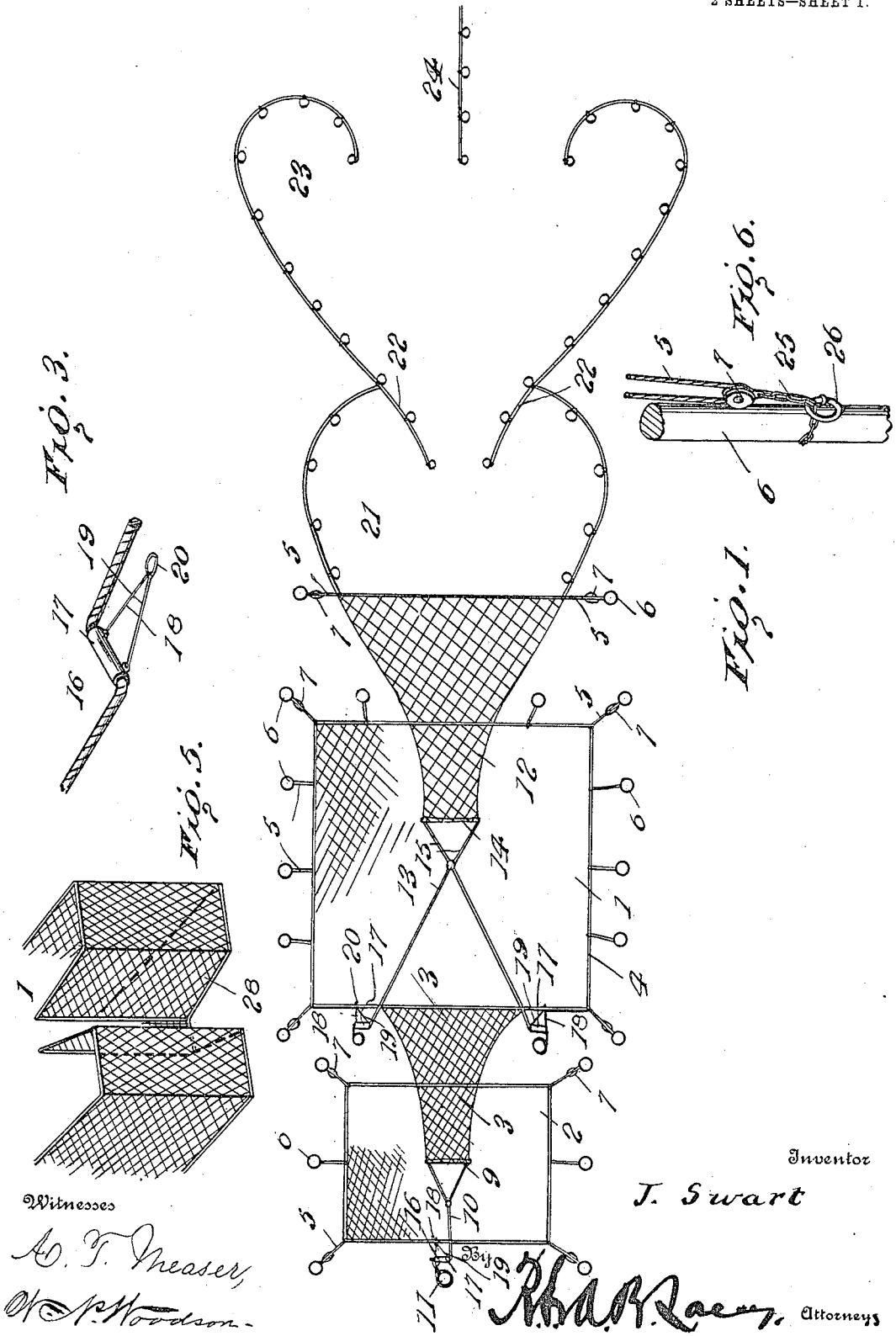

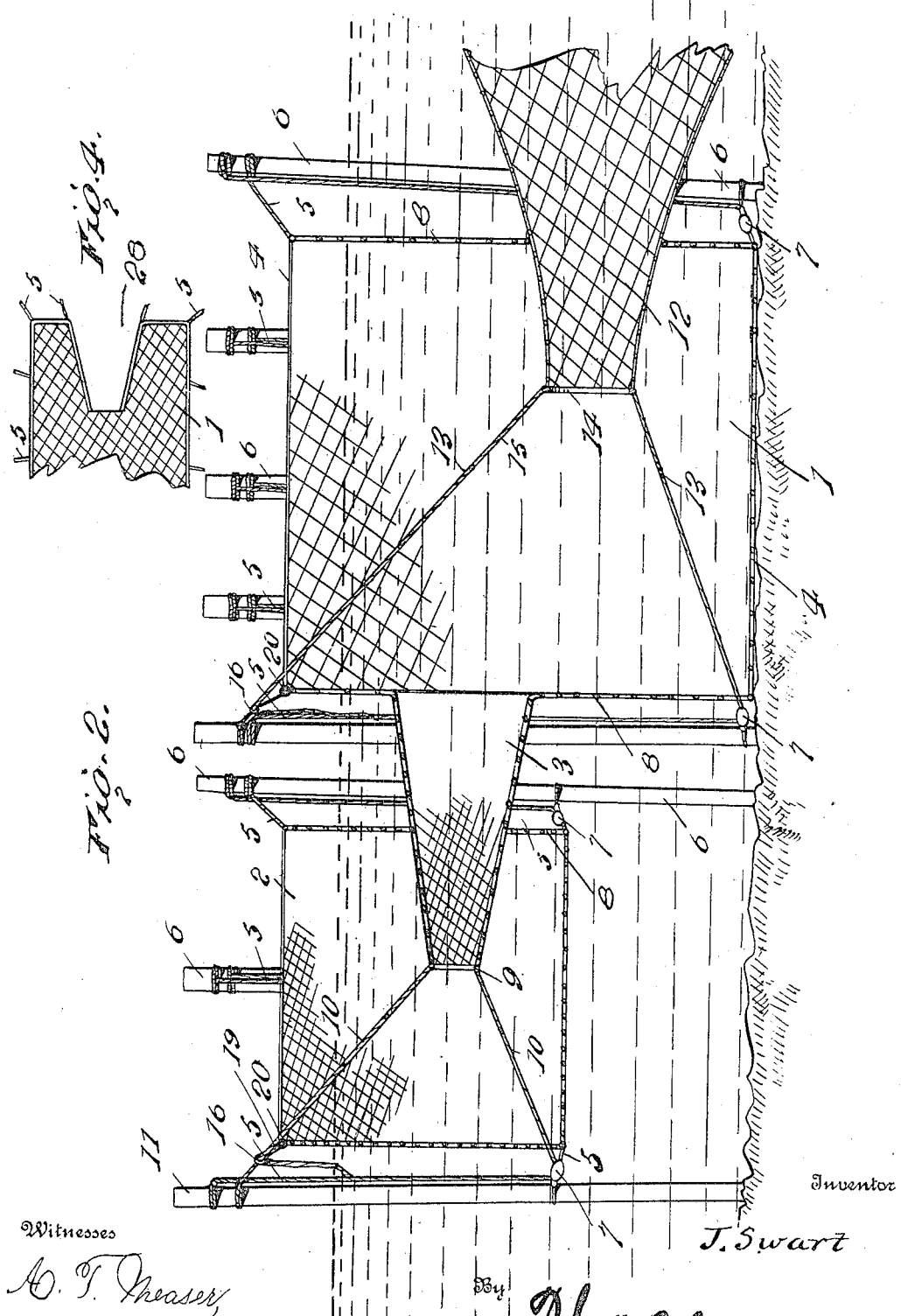

JEROME SWART, OF PALMER, VIRGINIA.

FISH-TRAP.

No. 831,690.  Specification of Letters Patent.  Patented Sept. 25, 1906.

Application filed May 2, 1906. Serial No. 314,865.

*To all whom it may concern:*

Be it known that I, JEROME SWART, a citizen of the United States, residing at Palmer, in the county of Lancaster and State of Virginia, have invented certain new and useful Improvements in Fish-Traps, of which the following is a specification.

The present invention relates to an improved fish-trap of that type which comprises a series of inclosures, the fish being led from one inclosure to the other until they reach the final inclosure from which they are collected.

For a full description of the invention and the merits thereof and also to acquire a knowledge of the details of construction of the means for effecting the result reference is to be had to the following description and accompanying drawings, in which—

Figure 1 is a plan view of the preferred form of fish-trap. Fig. 2 is a vertical sectional view through the same, a portion being broken away. Fig. 3 is a detail view of one of the rope-clamps. Fig. 4 is a plan view of a portion of the larger trap, showing a modified form of entrance. Fig. 5 is a perspective view of a portion of the large trap, showing a modified form of entrance for same; and Fig. 6 is a detail view of a portion of one of the stakes and shows the method of connecting the pulleys thereto.

Corresponding and like parts are referred to in the following description and indicated in all the views of the drawings by the same reference characters.

The device comprises, essentially, a large trap 1, formed with a coarse mesh and permanently fixed in position, and a small trap 2, connected to the large trap 1 by means of the funnel 3 and formed of a comparatively fine mesh, the small trap being located directly opposite the entrance to the large trap. The large trap 1 is formed with the reinforcing-ropes 4, which extend around the top and bottom edges thereof and is held in position by means of twine 5, which connects the reinforcing-ropes to the stakes 6.

In the preferred construction five of the stakes are located upon each side of the larger trap 1 and two stakes at each end thereof, the corner-stakes and the center stakes on each side being provided toward their lower ends with pulleys 7. As shown in Fig. 6, each of the pulleys 7 is secured to its stake by means of a chain 25, having a ring 26 at the end thereof, the portion of the chain adjacent the ring being pulled through the same to form a slip-noose which fits around the stake. The cords 5, connected to the lower reinforcing-rope 4, pass around the pulleys 7 and extend up along the stakes 6, having their extremities tied or otherwise connected to the said stakes. The upper and lower reinforcing-cords 4 are connected by means of the vertical reinforcing-ropes 8, so that all strain is taken up by the said ropes when the net is stretched. It will thus be understood that by letting out or taking in the ropes passing around the pulleys 7 the net can be loosened or tightened, as found necessary. The smaller trap 2 is supported in a manner similar to that employed for the larger trap, but is considerably shallower and does not extend as deeply into the water. The outer portion of the funnel 3, or that portion between the two traps, diverges outwardly toward the larger trap, and thus forms a large mouth for the entrance of the fish. The inner portion of the funnel 3, or that located within the smaller trap, terminates in a ring 9, of iron or similar material, and is held in position by means of the funnel-lines 10, which are connected to the upper and lower portions, respectively, of the stake 11, which is located opposite the end of the funnel.

In the preferred form of the invention the inlet to the large trap 1 is in the nature of a second funnel 12, similar to the funnel 3, but preferably somewhat larger. The inner portion of the funnel 12 is held in position by means of two pairs of diverging funnel-lines 13, which are connected to the upper and lower portions, respectively, of the two stakes at the end of the trap 1 opposite the end of the funnel. For the connection of each of the pair of diverging lines 13 with the ring 14 at the end of the funnel 12 ropes 15 are employed which flare in the opposite direction and have their ends secured to the ring. The upper pair of diverging lines 13 employed for supporting the funnel 12 and the upper line 10 for supporting the funnel 3 also serve to stretch the nets, and in order to secure an adjustable connection between the two members clamps 16 are employed, each of which comprises a sleeve 17, provided at one end with a laterally-extending arm 18, disposed at approximately right angles to the sleeve and being reinforced by a diagonal member 19, connected to the opposite end of the sleeve. At the point where the members 18 and 19 meet a loop 20 is formed, through which the reinforcing-rope around the upper edge of the net is passed. When the net is in tension, the sleeve 17 is caused to form an offset portion in the line passing therethrough and to frictionally engage the line, so as to prevent any slipping thereof. However, should any adjustment be required the same can be accomplished by swinging the clamping member 16 around until the sleeve 17 is in alinement with the rope and then sliding the sleeve to the desired position. The sides of the outer portion of the funnel 12 leading into the large trap 1 form a continuation of the sides of an inner heart member or false pound 21. It will also be observed that the inwardly-extending ends 22 of the side of the heart 21 form a continuation of the sides of the larger heart or false pound 23. The usual leader 24 is shown as extending outwardly from the heart 23 in order to intercept the fish and cause them to enter the trap. Under certain conditions it may be found desirable to provide the larger trap 1 with an open mouth 28, as indicated in Fig. 4, the sides of which are vertical and extend from the top to the bottom of the trap.

In the operation of the device the larger trap 1, which is formed of the coarser net, is permanently placed in position and serves as a reservoir to hold the fish until they enter the smaller trap 2, which is formed of the fine mesh and is of such a size that it can be readily fished in a very swift current or in rough weather, where it would be impracticable to loosen the larger net. Owing to the fact that the fish in the larger pound are not disturbed when the smaller pound is fished, the small fish which might pass through the larger meshes in the pound 1 will in most instances eventually pass into the smaller pound, and very few fish will be lost. An important feature of the invention resides in the fact that the small trap 2 is located directly opposite the entrance to the large trap 1 and the fish have a straight passage from the leader to the small trap, from which they are fished. In setting these traps they are so placed that the tide flows transversely across the leader and nets, with the result that if the small trap were located upon one side of the large trap the connecting-funnel between the two traps would have the same direction as the current, and the fish entering upon one tide would leave upon the next tide. In the present device, however, the tide sweeps across the connecting-funnel 3 and the trap works with equal efficiency on both tides.

Having thus described the invention, what is claimed as new is—

In a fish-trap of the class described, the combination of the main or large pound 1, the small pound 2 located at one side of the main pound 1 and elevated with reference thereto, stakes surrounding the pounds, ropes connecting the large pound 1 with the adjacent stakes, and other ropes connecting the small pound 2 with its adjacent stake, a funnel-shaped entrance 3 leading from the large pound 1 into the small pound 2, ropes 10 leading upwardly and downwardly from the inner extremity of the entrance 3 and connected with the opposite stakes of the small pound 2, a second funnel-shaped entrance 12 leading into the large pound 1, ropes 13 leading upwardly and downwardly from the inner extremity of the funnel-shaped entrance 12 and connecting the same with the opposite stakes of said pound 1, both of the entrances 3 and 12 being located centrally of the respective pound into which they lead and being in vertical longitudinal alinement, outer inclosures 21 and 23 leading to the entrance 12 of the pound 1 and of heart shape, the sides of the inclosure 21 forming continuations of the sides of the entrance portion 12, the sides of the inclosures 23 extending into the inclosure 21, and a leader 24 terminating at one end adjacent to the mouth or entrance of the inclosure 23 and extending therefrom in the customary way.

In testimony whereof I affix my signature in presence of two witnesses.

JEROME SWART.

Witnesses:
  V. B. HILLYARD,
  J. D. YOAKLEY.